United States Patent [19]

Baumgartner et al.

[11] Patent Number: 4,738,146
[45] Date of Patent: Apr. 19, 1988

[54] PIEZORESISTIVE FORCE-MEASURING ELEMENT AND ITS USE FOR DETERMINING FORCES ACTING ON A COMPONENT

[75] Inventors: Hans-Ulrich Baumgartner, Winterthur; Reto Calderara; Hans-Conrad Sonderegger, both of Neftenbach; Peter Weber, Uerikon, all of Switzerland

[73] Assignee: Kristal Instrumente A.G., Winterthur, Switzerland

[21] Appl. No.: 933,939

[22] Filed: Nov. 24, 1986

[30] Foreign Application Priority Data

Mar. 18, 1986 [EP] European Pat. Off. ........ 86103674.7

[51] Int. Cl.$^4$ .......................... G01L 1/18; G01L 1/06; H01C 10/12
[52] U.S. Cl. .............................. 73/862.68; 73/862.52; 338/114
[58] Field of Search ................ 73/862.53, 862.68, 167, 73/709, 787, 862.52; 338/47, 114

[56] References Cited

U.S. PATENT DOCUMENTS

| 2,090,188 | 8/1937 | Dahlstrom | 73/862.68 |
| 3,635,077 | 1/1972 | Rauch | 73/787 X |

FOREIGN PATENT DOCUMENTS

| 1932899 | 1/1971 | Fed. Rep. of Germany . | |
| 243915 | 5/1969 | U.S.S.R. | 73/862.68 |
| 505915 | 5/1976 | U.S.S.R. | 73/862.68 |

OTHER PUBLICATIONS

"A New Force Sensor with Metal Measuring Grid Transverse to the Lines of Force", *Sensor and Actuators*, 7 (1985), 223–232.

Yasumoto et al, "A Convenient Technique . . . Manganin Gauge", Jpn. J. Appl. Phys., vol. 19 (9/80), No. 9, pp. 1805–1806.

*Primary Examiner*—Charles A. Ruehl
*Attorney, Agent, or Firm*—Barnes & Thornburg

[57] ABSTRACT

A piezoresistive force-measuring element comprises at least two force-introduction plates with an electrical conductor subjected to plastic deformation arranged between them. The force-introduction plates transmit the forces acting on them without mechanical shunting onto the conductor between them. The change of electrical resistance caused by the force sustained can be used to measure force, accompanied by plastic as well as elastic deformation of the conductor. The typically annular or rectangular force-introduction plates can be fitted inside a housing which may include a bridge circuit for determining the resistance change as well as other electronics enabling the device to be used as a transmitter. By placing the conductor in grooves or anchoring it in the pores of the adjacent plates, an essentially hydrostatic loading of the conductor is obtained, bringing an enormous extension of the measuring range while the measuring accuracy is enhanced owing to the reduced hysteresis. The sensitivity and the measuring range can be adjusted by appropriate prior deformation of the conductor. Permanent deformation of the conductor resulting from high loads makes possible subsequent determination of the magnitude of the peak forces acting on the measuring element.

23 Claims, 5 Drawing Sheets

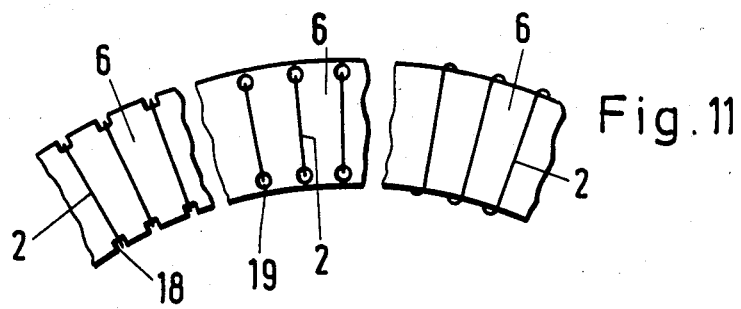
Fig. 11
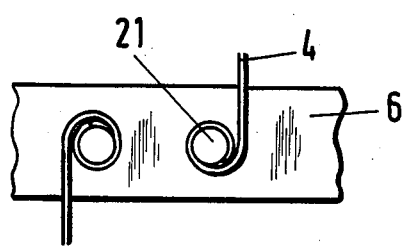
Fig. 12a
Fig. 12b
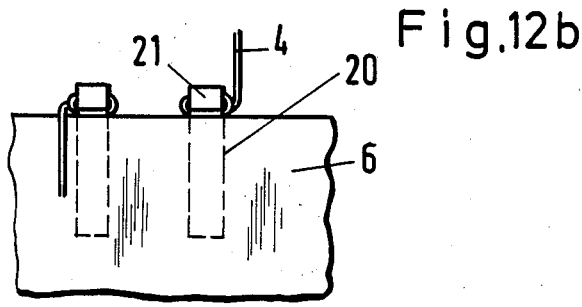
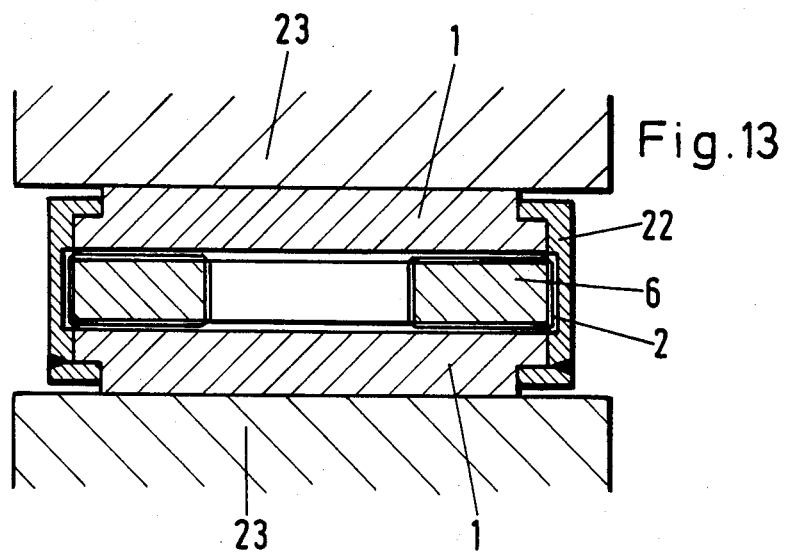
Fig. 13

PIEZORESISTIVE FORCE-MEASURING ELEMENT AND ITS USE FOR DETERMINING FORCES ACTING ON A COMPONENT

The invention relates to a piezoresistive force measuring element consisting of at least two force introduction plates for transmitting the force onto at least one electrical conductor between them, whose specific electrical conductivity depends on pressure, whereby the force transmission is essentially perpendicular to the principal orientation of the conductor. The invention relates further to the use of such a force measuring element to determine an interacting peak force or the behavior of forces against the time scale.

In the development of new technical equipment, force transducers are needed for verifying the force calculations or for supervising manufacturing processes or machine functions. Force measurements are often planned subsequently, when a new design reveals undesirable properties whose causes are not immediately apparent. At the first draft of a new design, the need for force measurements does not occur to the designer, with the result that there is often no room for force transducers. Many of the force transducers now available commercially have large dimensions, so that they cannot be fitted often on account of the confined space. Piezoelectric force transducers are known of flat, typically discoid or annular form, so that they require little volume and are often fitted as washers on shafts or between two abutting machine components. Though these force transducers demand little space, they do not allow static measurements. The zero must be set before measuring, usually by grounding at the amplifier input, and it may drift if the measuring operation lasts over longer periods of time. This uncertainty regarding the zero point precludes the use of piezoelectric transducers for certain measurements. In such cases, resort is had to transducers with strain gauges, as well as capacitive or inductive force transducers, but these are much bulkier and in particular cannot be made flat. A large number of the commercially available force transducers with strain gauges make use of the longitudinal piezoresistive effect, i.e., the resistance wire is elongated lengthwise by the substrate to which it adheres, thereby increasing its electrical resistance. The resistance increase serves as a measure for the elongation or strain. It has also been suggested (cf. for example, Oppermann, "A new force sensor with metal measuring grid transversal at the lines of force," Sensors and Actuators, 7 (1985) p. 223 ff.) that instead of the longitudinal effect, use might be made of the transverse piezoresistive effect likewise already known for quite some time, whereby the force direction and the current flow direction are at right angles to each other, allowing the force transducer to be designed flat. The known transducer employs sputtered-on layers as resistance material, or Zeranin strips etched from foil. Force measuring takes place in the elastic deformation range of the material, so that the measuring range of the known transducer is very restricted. Moreover the known transducer does not allow the adjustment of a particular desired measuring sensitivity.

From the DE-A- No. 19 32 899 a force transducer is known based on the transverse piezoresistive effect, whereby a conductor in linear or surface form, consisting of resistance material, is arranged between two elastic force introduction parts by means of an elastic insulating layer. Force shunts occur, because not all force lines pass through the electrical conductor, so that the measuring sensitivity is impaired. The relatively undefined fixing of the conductor owing to the elastic carrier or insulating layer allows lateral strains, leading to electrical zero drift which has to be corrected. The elasticity of the force introduction parts gives rise to measurement hysteresis phenomena, making the transducer in question unsuitable for practical use. Moreover the overall dimensions of such transducers are large in relation to the usable measuring range. Adjusting the transducer to a given sensitivity is no more possible than measuring particular peak forces acting on a component. By contrast, the invention is based on the need for a piezoresistive force element of the kind mentioned hereinabove, which makes use of the transverse effect, is capable of being produced flat and space-saving like the piezoelectric transducers, and enables interacting forces to be measured exactly within a wide measuring range and over longer test periods.

The underlying problems are solved according to the present invention in that the conductor is plastically deformed between the force introduction plates by a preload force and the lines of action of the forces to be measured penetrate the conductor essentially without mechanical shunting.

According to the present invention, the conductor is arranged to be deformed irreversibly, i.e., plastically by prepressing between the force introduction plates, and the latter are designed so that they transmit the forces to be measured onto the conductor without mechanical shunting. The prepressing with plastic deformation of the conductor considerably widens the measuring range of the force measuring element, as will be explained later, and also enables the sensitivity of the transducer to be adjusted for the particular application. The conductor may be wound on a carrier plate, preferably of ceramic material, with the carrier plate sandwiched between two force introduction plates consisting also preferably of ceramic and therefore porous material. Owing to the prepressing the conductor or resistance wire is deformed by the force acting at right angles to its longitudinal direction. Both the irreversible resistance change due to plastic deformation and the reversible resistance change under elastic deformation of the conductor can be used for the force measurement, the former enabling certain peak loads to be measured, for example, in ballistics, while the latter allows a continuous force measurement during a process. Owing to the rigidity of the force introduction plates, the force is introduced without mechanical shunting, so that the measuring accuracy is considerably enhanced. Owing to the plastic flow of the conductor material into the natural pores of the force introduction plates, the conductor is firmly anchored thereat so that the one-dimensional loading by an interacting force is converted, as it were, into an essentially hydrostatic loading of the conductor, which results in an enormously enlarged usable measuring range and a significant reduction of hysteresis effects. Instead of anchoring the conductor in the pores of the force introduction plates or carrier plates, the same effect can be obtained by placing the conductor into grooves in these plates. To eliminate the influence of the ambient temperature on the momentary resistance or zero point, a compensating conductor of the same material as the measuring conductor can be provided on a suitable unloaded place on the measuring element.

These and other objects, features, and advantages of the present invention will become more apparent from the following description when taken in connection with the accompanying drawings which show, for the purposes of illustration only, several embodiments in accordance with the present invention, and wherein.

Figure 6A:
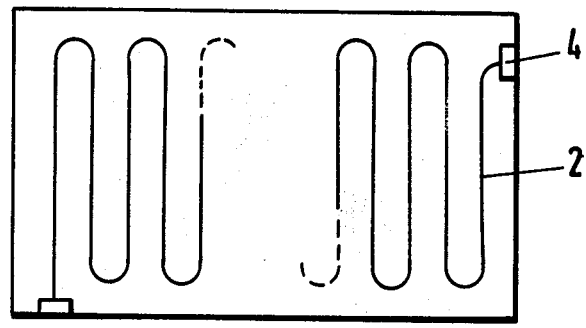

FIGS. 6a and b are, respectively, a plan and elevational view of the grooved upper and lower force introduction plates of an embodiment with the resistance wire arranged meandering between the two plates and laid in the grooves.

Figure 7A:
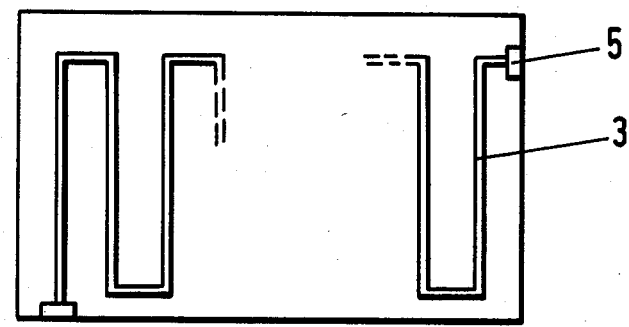
Figure 7B:
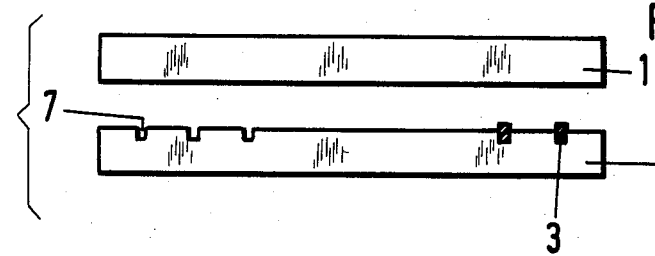

FIGS. 7a and b are, respectively, a plan and elevational view of the grooved upper and lower force introduction plates of an embodiment analogous to FIGS. 6a and b but having an electrically conductive layer sputtered-on or vapor-deposited instead of a resistance wire.

Figure 8:
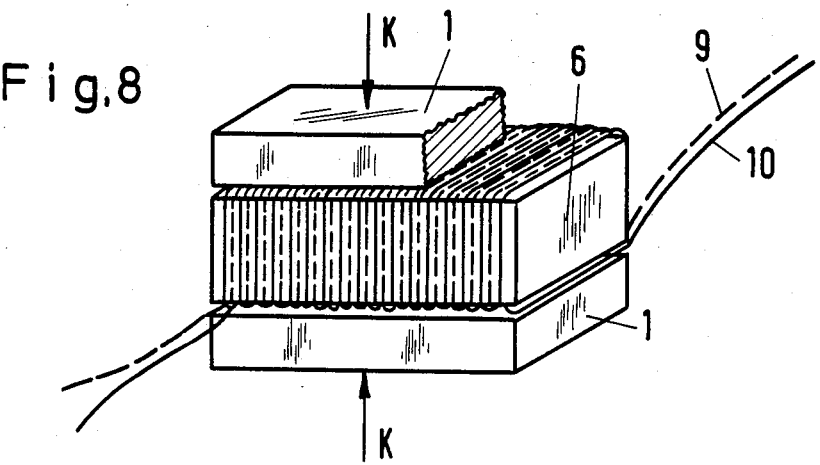

FIG. 8 is a perspective view, partly broken away, of a carrier plate with a twin-wire winding between two force introduction plates.

Figure 9:
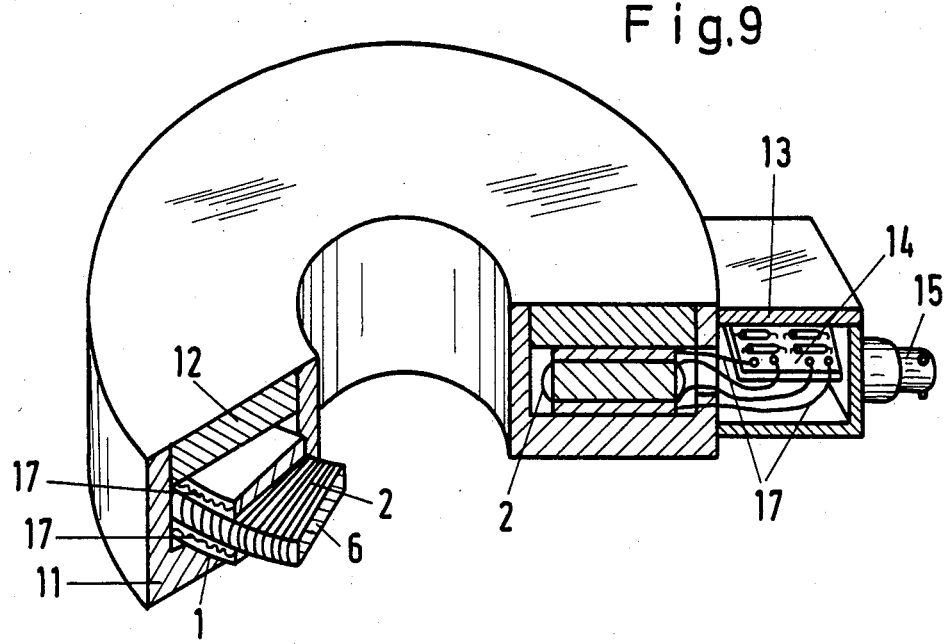

FIG. 9 is a perspective view, partly broken away, of a complete force measuring element according to the invention with the associated electronics in a suitable housing.

Figure 10:
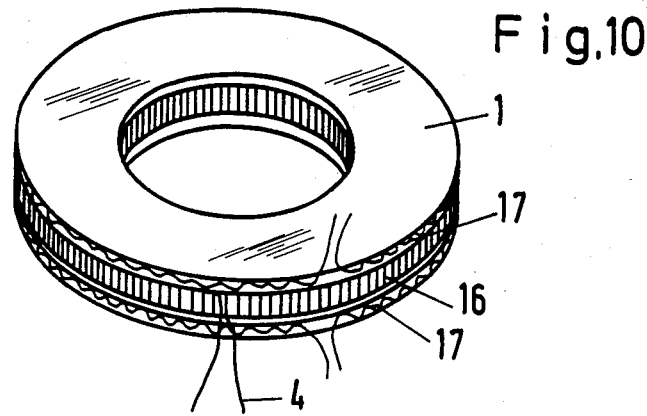

FIG. 10 is a perspective view of a piezoresistive force measuring element with a temperature-compensating conductor placed in a circumferential groove.

FIG. 11 is a partial plan view of segments of the annular carrier plate, on which various methods of fixing the wire windings are illustrated (notches holes, adhesion).

FIGS. 12a and b are, respectively, a plan and elevational view of the anchoring of the winding ends on two metal pins at the edge of the carrier plate, and FIG. 13 is a cross-sectional view through the covering of the force introduction plates with a plastic sleeve.

Suitable resistance materials are typically Manganin (12% Mn, 2% Ni, 86% Cu), Zeranin (12% Mn, 2% Ni, 0.5% Ge, 85.5% Cu) or chromium-nickel alloys, which all have a very low temperature coefficient of resistance and a substantial piezoresistive coefficient. These resistance materials may also be used as layers vapor-deposited, sputtered-on or etched from foils.

Figure 1:
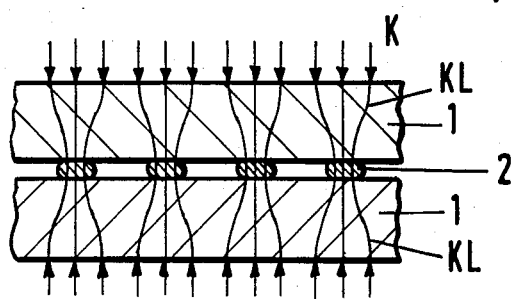
FIG. 1 is a partial cross-sectional view through two force introduction plates with plastically deformed resistance wires between them and the lines of force passing through them in accordance with this invention.

FIG. 1 shows two force introduction plates 1 with plastically deformed conductors 2 between them. It shows also that in accordance with the invention the lines of force caused by the introduced force K pass through the conductors 2 without mechanical shunting, thereby enabling the measuring range to be extended considerably and achieving independence of the force introduction point and force distribution. This is attained by employing mechanicaly rigid force introduction plates, consisting, for example, of ceramic material.

Elastic force introduction plates like those described in the German publication No. 1 932 899 mentioned above have a force shunt, resulting in narrowing the useful measuring range, and additionally producing undesirable hysteresis effects and zero drift. The flattening of the resistance wire used as conductor 2, likewise shown in FIG. 1, preferably by an amount between 10% and 40% of the diameter, causes it to be anchored in the pores of the force introduction plates 1, so that the loading of conductor 2 by a one-dimensional pressing force is converted into an essentially hydrostatic load. The usable measuring range is widened enormously thereby.

Figure 2:
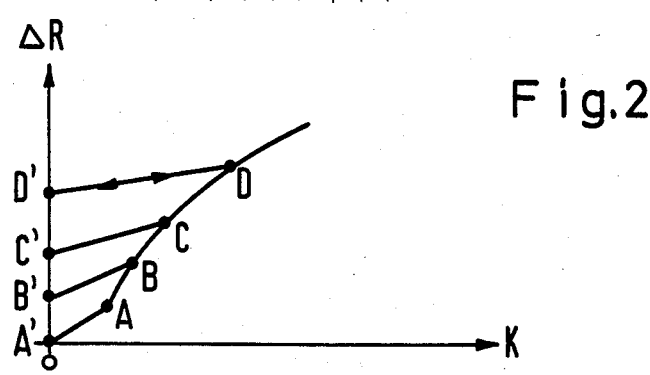
FIG. 2 is a diagram graphically illustrating the correlation between the force to be measured and the resistance change, for example, of a wire in the plastic and elastic deformation ranges.

The processes involved in the irreversible resistance change due to plastic deformation and the reversible resistance change due to elastic deformation will be explained with reference to FIG. 2. FIG. 2 shows the correlation between the magnitude of the prepressing or measuring force K and the resistance change R of the conductor. Under low load from O to A the resistance wire is deformed elastically. When the force K is increased beyond A as far as B, the wire material begins to flow, i.e. plastic deformation commences and the wire is flattened. On account of the reduced cross-section of the wire due to flattening, the curve is steeper from A to B than from A' to A. Both the elastic and the plastic deformation components or the wire cause resistance increases, whose effects are additive.

By steadily increasing the load, the curve is extended through C and finally to point D, flattening off all the time because the force introduction plates 1 are resting on an increasingly large area of the progressively flattened wire, so that the specific load per unit of the load diminishes. This in turn has as a consequence that rates of the increase of the electrical resistance to the load increase, R/K, decreases with increasing load, i.e., the steepness of the curve thus continuously decreases from A by way of B and C to D. If the load is raised as far as point D and then subsequently relieved, the curve of the electrical resistance versus load follows the linear branch D - D', reaching the point D' when fully unloaded. Under renewed load, at first the branch D - D' is passed through. This reversibility denotes the elastic measuring range, whereby the slope of the straight line D'- D characterizes the measuring sensitivity and the load associated with point D the reversibly usable measuring range. If the load application had been terminated already at A, B or C, it would be possible to follow analogously the linear and reversibly negotiable curve branches C'- C. B'- B or A'- A, whose slopes differ for the same reasons as above for plastic deformation. It will be clear from this that it is possible to adjust the measuring sensitivity selectively by means of a preload force. Assuming that during a ballistic experiment the force reaches its peak value at D, then the resistance change given by the value D'- A' is a direct measure of this peak, because the branches A'- A - B - C - D' are passed through during the experiment. Consequently the resistance change characterized by the line D'- A' is a direct measure for the permanent plastic deformation of a conductor caused by a force peak. It is thereby not necessary to connect a measuring instrument during the experiment. Measuring the electrical resistance before and after the experiment is sufficient.

Figure 3:
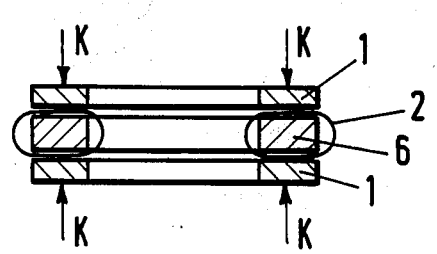
FIG. 3 is a cross-section through a ceramic ring assembly with a resistance winding in accordance with the invention.
Figure 4:
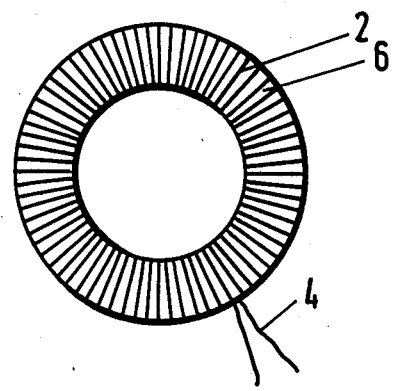
FIG. 4 is a plan view on the carrier plate with wound-on resistance wire of the annular embodiment.
Figure 5:
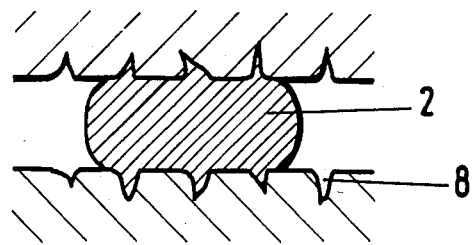
FIG. 5 is a partial cross-sectional view, greatly enlarged, through the anchoring of a resistance wire in the pores of two ceramic force introduction plates.

FIG. 3 shows in cross-section an annular carrier plate 6 with a resistance wire 2 wound thereon, constrained between two annular force introduction plates 1. FIG. 4 shows the wound carrier plate 6 in top plan view. A plate assembly of this kind is advantageously preloaded with a pressing force sufficient to flatten the winding wire by an amount between 10% and 40% of its diameter. The resistance wire 2 is flattened on both sides of the carrier plate 6 by the pressing operation, as already illustrated in FIG. 1. FIG. 5 shows an enlarged detail of a section through a pressed wire, with the resistance wire 2, whose material penetrates into some of the pores 8 of the carrier plate 6 and of the two force introduction plates 1, thus anchoring the resistance wire 2 in the three plates.

Figure 6B:
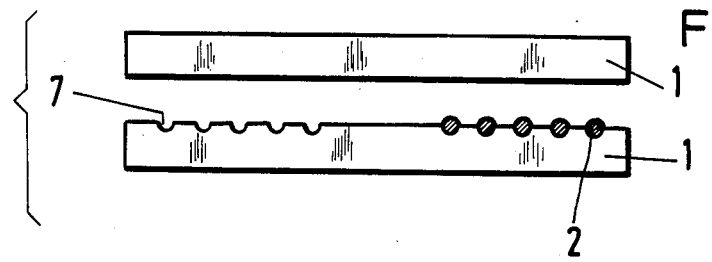

This anchoring of the force introduction plates 1 with the resistance wire 2 serves mainly to convert the one-dimensionally acting pressing force into an essentially hydrostatically acting load on the resistance wire, through the creation of a lateral opposing force by the compression. The usable measuring range is widened enormously thereby. It can reach up to several thousand $N/mm^2$- a load which the wire would not withstand in a uniaxial stress state. Hydrostatic loading of the resistance wire 2 can be achieved also by placing it in grooves 7 on one or both sides, as shown in FIG. 6b. In this embodiment, the wire meanders between two force introduction plates 1, one of which is provided with grooves 7. FIGS. 7a and b show another embodiment in accordance with the invention. Instead of a wire, an electrically conductive layer 3 is employed in this embodiment which is vapor-deposited, sputtered-on or formed by an etching process. It too may be anchored in grooves 7.

FIG. 8 shows another embodiment using a resistance wire 2, with the carrier plate 6 and the force introduction plates 1 rectangular in shape. Another variant possible is a double-wire winding with two wires 9 and 10 as indicated in this figure. By the use of such a winding, two separate resistances are obtained, which may be connected as two active arms on opposite sides of a bridge circuit, thereby doubling the sensitivity.

Another consequence of anchoring the resistance wire 2 in the force introduction plates 1 and 6, for example, by means of pores 8, is that these plates form an assembly unit with the wire. This unit can be placed in a suitable housing 11, 12, creating a force transducer as shown in FIG. 9. This transducer has a preferably face-ground bottom with its side casing 11 and top cover 12 also face-ground. The housing bottom and cover are advantageously joined together under preload, so that the plate assembly 1, 6, 1 is pressed together on the inside. Conveniently attached to the housing 11, 12 is an electronics housing 13 with an electronic conductor board 14 and a connector 15. The electronics housing 13 accommodates the compensating resistors and amplifiers consisting of the same material as the pressed wire. The force transducer of FIG. 9 can thus be made, for example, into a force transmitter.

FIG. 10 shows the possibility of recessing the compensation winding in a circumferential groove on a force introduction plate 1. This is a very advantageous way of fitting the winding 17, because the compressive force cannot act on the compensation winding and the arrangement saves space. Moreover, the compensation winding 17 has the same temperature as the measuring winding 16, because it touches the same body.

Winding the carrier plates with resistance wire is generally accomplished on a winding machine. Manual winding is also possible, especialy for small rings. If erratic resistance changes are to be avoided, the wire turns must not touch.

Manual winding often requires winding assists. FIG. 11 shows typical examples of such assists, intended as wire guides. The left-hand ring segment has notches 18 in which the wire is placed. The middle segment has holes 19 through which the wire is drawn. Because the ceramic material of the carrier plate 6 is costly and bothersome to machine, it may be advantageous to provide it with an adherent edging of softer insulating material, in which the notches 18 or holes 19 can be produced easily. The right-hand segment shows the winding adhering to the bare ring surface.

A certain problem is encountered with the winding entries and exits when pressing the force introduction plates 1, 6. If the wire gets between two pressed-together plates, it undergoes a change of cross-section from oval (inside) to circular (outside), causing a certain notch effect so that the wire breaks off at this point after only a few movements. It is advisable to provide the edge of the carrier plate 6 with two blind holes 20, in which brass or copper pins 21 are fixed by means of an adhesive. The wires 4 of the winding ends can then be soldered permanently to these pins 21. At the same time, these pins 21 may serve as soldering terminals for the feeder cable (FIGS. 12a, b).

Finally, FIG. 13 shows an embodiment whereby the force introduction plates 1 keep the carrier plate 6 wound with the resistance wire 2 under preload by means of a weld plastic sleeve 22, forming thereby a unit specially suited for direct force introduction between two force introduction punches 23.

The invention thus enables the realization of very flat force measuring elements with high load capacity, capable of finding use in a great variety of transducers for measuring forces, pressures and accelerations.

A special advantage over the prior art construction is the possiblity of employing the force-measuring elements according to the invention not only in the elastic range but also for physically storing overloads as a crash sensor, for evaluation at any time after the overload event without any need to have the force-measuring element connected electrically during the overload event.

By means of a practical example, it will be shown how the two mentioned cases, i.e. reversible measuring in the elastic range and subsequent determination of a peak force which was effective during an overload event, can be combined to advantage. If for example, the force-versus-time curve is to be plotted during one or more pressing cycles on a press, the force-measuring element operates in its elastic and therefore reversible range. The process is recorded anew continuously. If the press tool is overloaded, because its resistance has deteriorated during its working life, fracture may result. When analyzing such accidents, it is of course desirable to know what peak force was responsible for the tool failure. Determining this peak force is a simple matter with the force-measuring element according to the present invention, since only one resistance measurement must be made at the start of the experiment and another one any time after the breakage. In this case, the force-measuring element functions as a physical memory or crash-sensor, which can serve as evidence.

The physically stored peak forces involved in an accident are also of interest, for example, in connection with critical load-bearing components of aircrafts, spacecrafts and locomotives.

The measurement and recording of accelerations and pressures can be derived from the measurement and recording of forces.

Accordingly, the force-measuring element described, when it operates in the plastic-deformation range, functions analogously as crash sensor for pressures, as occur typically in dust explosions, explosions in autoclaves and other containers for explosive liquids and gases. As shock accelerometer for accelerations, the force-measuring element can be used to analyze accidents with aircraft and spacecraft. Particularly in this case, it is capable of providing evidence of special importance. Crash sensors may be designed as full installation plates or as load washers, for example, as a force-measuring element according to the invention in a hermetically sealed housing as shown in FIG. 9.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such changes and modifications as are encompassed by the scope of the appended claims.

We claim:

1. A piezoresistive force-measuring element, comprising at least two force-introduction plates for transmitting a force onto at least one electrical conductor arranged therebetween, the specific electrical conductivity of said conductor depending on pressure, the force being transmitted essentially at right angles to the main orientation of the conductor, the conductor being plastically deformed between the force-introduction plates by a preload force, and the lines of action of the forces to be measured penetrating through the conductor essentially without mechanical shunting.

2. A force-measuring element according to claim 1, wherein the force-introduction plates consist of an electrically insulating material.

3. A force-measuring element according to claim 2, wherein the insulating material is a porous ceramic.

4. A force-measuring element according to claim 3, wherein the element's sensitivity is adjustable to a certain value in the elastic-deformation range of the conductor by varying the preload force.

5. A force-measuring element according to claim 4, wherein the sensitivity of the element is adjustable to an integer-calibration constant.

6. A force-measuring element according to claim 1, wherein the conductor is anchored in pores of the force-introduction plates by plastic deformation.

7. A force-measuring element according to claim 1, wherein the conductor is arranged in grooves.

8. A force-measuring element according to claim 1, wherein the conductor is mounted on a carrier plate which is arranged between said two force-introduction plates.

9. A force-measuring element according to claim 8, wherein the plates are of essentially rectangular shape.

10. A force-measuring element according to claim 8, wherein the plates are of annular shape.

11. A force-measuring element according to claim 8, wherein the electrical conductor is mounted on the carrier plate in the form of a toroidal winding.

12. A force-measuring element according to claim 8, wherein the arrangement of force-introduction plates, carrier plate, and conductor are assembled in a housing under mechanical prestress.

13. A force-measuring element according to claim 12, wherein the housing encloses an unloaded compensating conductor of the same material as the conductor in order to compensate the effect of temperature on the change of resistance.

14. A force-measuring element according to claim 13, wherein the compensating conductor is recessed in a circumferential groove on at least one of the force-introduction plates or carrier plate.

15. A force-measuring element according to claim 8, wherein the carrier plate is wound with twin conductors wire, each winding forming an opposite arm of a bridge circuit.

16. A force-measuring element according to claim 1, wherein the conductor forms at least one arm of a bridge circuit.

17. A force-measuring element according to claim 1, wherein the force-introduction plates together with supplementary electronics are accommodated in a housing to form a transmitter.

18. A force-measuring element according to claim 1, wherein the element's sensitivity is adjustable to a certain value in the elastic-deformation range of the conductor by varying the preload force.

19. A force-measuring element according to claim 18, wherein the sensitivity of the element is adjustable to an integer-calibration constant.

20. A force-measuring element according to claim 1, wherein the plates are of essentially rectangular shape.

21. A force-measuring element according to claim 1, wherein the plates are of annular shape.

22. Use of a piezoresistive force-measuring element according to claim 1 for determining a peak force sustained, which results in a further irreversible deformation of the electrical conductor, comprising the steps of measuring the resistance of the electrical conductor before and any time after the action of the peak force, with or without connection of the force-measuring element to a measuring instrument while the force is applied, and determining the peak force from the change of resistance caused by the irreversible deformation.

23. Use of a piezoresistive force-measuring element according to claim 1 for determining the behavior against the time scale of forces sustained, comprising the step of selecting the measuring range to ensure that the forces imposed cause essentially only reversible elastic deformation of the conductor.

* * * * *